(12) United States Patent
Lepien

(10) Patent No.: US 6,636,850 B2
(45) Date of Patent: Oct. 21, 2003

(54) AGGREGATE SCORE MATCHING SYSTEM FOR TRANSACTION RECORDS

(75) Inventor: Dana Lepien, Maple Grove, MN (US)

(73) Assignee: FairIsaac and Company, Inc., San Rafael, CA (US)

( * ) Notice: Subject to any disclaimer, the term of this patent is extended or adjusted under 35 U.S.C. 154(b) by 453 days.

(21) Appl. No.: 09/750,525

(22) Filed: Dec. 28, 2000

(65) Prior Publication Data

US 2003/0041059 A1 Feb. 27, 2003

(51) Int. Cl.⁷ .............................................. G06F 17/30
(52) U.S. Cl. ............................... 707/6; 707/3; 705/10; 705/26
(58) Field of Search .............................. 707/6, 3, 5, 10, 707/100; 705/10, 26; 709/224; 379/201.03; 370/52

(56) References Cited

U.S. PATENT DOCUMENTS

| | | | |
|---|---|---|---|
| 5,384,449 A | 1/1995 | Peirce ......................... | 235/380 |
| 5,404,510 A | 4/1995 | Smith et al. ................ | 395/600 |
| 5,560,005 A | 9/1996 | Hoover et al. .............. | 395/600 |
| 5,642,485 A | 6/1997 | Deaton et al. .............. | 395/214 |
| 5,644,723 A | 7/1997 | Deaton et al. .............. | 395/214 |
| 5,649,114 A | 7/1997 | Deaton et al. .............. | 395/214 |
| 5,659,731 A | 8/1997 | Gustafson ................... | 395/604 |
| 5,682,539 A | 10/1997 | Conrad et al. .............. | 395/759 |
| 5,687,322 A | 11/1997 | Deaton et al. .............. | 395/214 |
| 5,724,575 A | 3/1998 | Hoover et al. .............. | 395/610 |
| 5,819,226 A | 10/1998 | Gopinathan et al. ........... | 705/1 |
| 5,832,462 A | 11/1998 | Midorikawa et al. .......... | 705/35 |
| 5,884,072 A | 3/1999 | Rasmussen .................. | 395/600 |
| 5,905,974 A | 5/1999 | Fraser et al. ................. | 705/37 |
| 5,917,891 A | 6/1999 | Will ........................ | 379/88.03 |
| 5,924,082 A | 7/1999 | Silverman et al. ............ | 705/37 |
| 5,996,076 A | 11/1999 | Rowney et al. .............. | 713/201 |
| 6,052,122 A | 4/2000 | Sutcliffe et al. ............. | 345/331 |
| 6,052,693 A | 4/2000 | Smith et al. ................ | 707/104 |
| 6,427,132 B1 * | 7/2002 | Bowman-Amuah .......... | 703/22 |
| 6,480,844 B1 * | 11/2002 | Cortes et al. .................. | 707/5 |
| 2002/0083067 A1 * | 6/2002 | Tamayo et al. ............. | 707/100 |

OTHER PUBLICATIONS

Miyagi, H.; Kinjo, I.; Fan, Y. discloses, "Qualified decision–making using the fuzzy relation inequalities", in Systems, Man, and Cybernetics, 1998. 1998 IEEE International Conference on, vol.: 2, Oct. 11–14, 1998, page(s): 2014–2018.*

Lum, W.Y.; Lau, F.C.M.; discloses, "A QoS–sensitive content adaptation system for mobile computing" in Computer Software and Applications Conference, 2002., Proceedings, 26th Annual International , (no month –2002), pages(s): 680–685.*

*Formalization of Pattern–Matching in List Structure*, Transactions of the Institute of Elecrtonics and Communication Engineers of Japan, vol. E60, No. 8, p. 442–3.

*A Hierarchical Decision Approach to Large–Vocabulary Discrete Utterance Recognition*, IEEE Transactions on Acoustics, Speech and Signal Processing, vol. ASSP–31, No. 5, p. 1061–6.

*CONVERTing: Pattern–Matching and List Processing for Turbo Pascal Programmers*, Micro Cornucopia, No. 33, p. 50–3.

*Matching Algorithms for Finite Point Sets in Plane*, IEEE Proceedings of Southeastcon '91, vol. 2, p. 1229–32.

*Sublist Assertions for Listless and Lazy Evaluation*, Computer Languages, vol. 17, No. 2, p. 133–46.

*Weakly–Matched Groups to Signal Constellations*, Proceedings of 1994 IEEE International Symposium of Information Theory.

*A Model–based Machine Vision System Using Fuzzy logic*, International Journal of Approximate Reasoning, vol. 16, No. 1, p. 119–35.

*A Corner Matching Algorithm with Uncertainty handling Capability*, Proceedings of the Sixth IEEE International Conference on Fuzzy Systems, vol. 3, p. 1469–74, vol. 3.

* cited by examiner

Primary Examiner—Diane D. Mizrahi
(74) Attorney, Agent, or Firm—Elenn Patent Group; Michael A. Glenn

(57) ABSTRACT

Method and apparatus that compares each field in two records to determine if the records match. The comparison function can be selected from among varied comparison function that enable close matches by examining all of the fields contained in the compared records.

19 Claims, 9 Drawing Sheets

PARAMETER BLOCK

| FIELD | PURPOSE |
|---|---|
| TITLE | NAME OF MATCHING PROCEDURE |
| CONFIGURATION | NAME OF CONFIGURATION FILE |
| REPORT | NAME OF OUTPUT REPORT FILE |
| MATCHING TABLE | POINTER TO MATCHING TABLE |

FIG. 2

MATCHING TABLE

| FIELD NAME | COMPARE TYPE | POS. VALUE | NEG. VALUE | POS. SCORE | NEG. SCORE |
|---|---|---|---|---|---|
| FIELD 1 | | | | | |
| FIELD 2 | | | | | |
| • | | | | | |
| • | | | | | |
| • | | | | | |
| • | | | | | |
| FIELD N | | | | | |

FIG. 3

AGGREGATE SCORE MATCHING SYSTEM FOR TRANSACTION RECORDS

BACKGROUND OF THE INVENTION

1. Technical Field

This invention pertains to the field of transaction data comparison. Specifically, the present invention pertains to the identification of duplicate data records where the contents of the data records may or may not be a perfect match.

2. Description of the Prior Art

Many matching methods have been devised. Most matching methods rely on a comparison of each position in a data field so that a match is declared when each position in the field is equal. These prior art matching methods are suitable for identifying duplicate records where the records are identical.

In most data processing systems used in the world today, data is stored in databases and once that data is so stored, it is seldom, if ever, reviewed by human analysts. This is especially true in the fields of customer relationship management where marketing databases are used to maintain information about potential customers and in transaction processing, where records of transactions must be correlated to a known description of a customer. All too often, a new data source is to be added to a database that describes the same individual or transaction and that individual or transaction can be depicted by a plurality of records. The reason for this is that the records stored in the database may not be exactly identical. A record may be incomplete in that some of the fields in the record may not be blank. A record can also include aliases that may be equivalent, but are not necessarily identical. And in the matching mechanisms previously known, records that are not identical will not be identified as duplicates of each other.

The problem of identifying duplicates in a database is amplified by the fact that records in a database are normally comprised of a plurality of fields. In the prior art, each field in two records subject to comparison would need to be checked for "sameness". If each field in two records were found to be identical, then the records could be flagged as duplicates of each other. This method would work except for the case where some fields in two records matched identically, but other fields may not match at all or they may contain aliases.

SUMMARY OF THE INVENTION

The present invention comprises a method and apparatus that allows for flexible comparison of a transaction record to a plurality of known data records. The present invention accepts transactions records from a computer application. The same computer application can specify a plurality of legacy records. These legacy records can exist, in for instance, a customer database. But the invention is not limited to use only in customer database applications.

Each of the legacy records is compared to the transaction record in sequence. Each of the comparisons is conducted on each record by examining each field in the transaction record and comparing the contents of the field to the contents of a corresponding record in one of the plurality of legacy records.

If a particular field in each of the two records being compared is found to be a match, then a positive accumulator is incremented. If the field does not match, then a negative accumulator is incremented. In the event that a field does not match, it must mismatch in order for the negative accumulator to be incremented. If a definitive mismatch does is not declared, then neither the positive nor the negative accumulators are incremented.

Once all of the fields in a record are compared, the positive accumulator is checked against a first positive threshold. Where the value of the positive accumulator exceeds the positive threshold, the records are deemed to be equivalents of each other. This means that a transaction record can be matched to a legacy record even though the two are not exactly identical.

If a particular record is not found to be an equivalent, then the value of the negative accumulator is compared to a second negative threshold. If the value of the negative accumulator exceeds that negative threshold, the two records are declared as non-equivalent.

A final check for equivalency is made by comparing the difference of the positive accumulator with the negative accumulator. If the difference between the positive and negative accumulators is greater than a third delta threshold, then the two records are declared to be equivalents of each other.

In all of these comparisons, the present invention supports a flexible means to program each of the thresholds, i.e. the positive threshold, the negative threshold and the delta threshold. The present invention also allows the increment value for each comparison to be programmed individually for each field in the records being compared. All of these programmable values are obtained from a configuration file.

The comparison of each field can be performed in a number of ways. Each of the comparison mechanisms employed returns either a positive match indication or a negative mismatch indication.

The present invention comprises a rudimentary comparison mechanism that tests for sameness where both fields are non-blank. A refinement of the equality mechanism returns positive if one or both records contain blank fields. Yet another comparison mechanism removes blanks and punctuation characters and then compresses both fields before checking for equality.

A means for testing the equality of a gender code also comprises the present invention. In this means, both fields under scrutiny must contain a gender code and that code must be the same in each record for a match to occur. The invention also comprises a gender mechanism that also tests a first name appended to the gender code to determine equivalence of two records.

The present invention further comprises a mechanism that tests for numeric equivalency. In this mechanism, both fields are converted into a numeric equivalent and then those equivalents are compared for sameness.

The present invention further comprises a comparison mechanism that removes blanks and special character before compressing both fields and then testing for equality. This mechanism only checks the two fields to the extent of the shortest of the two fields.

A close alpha comparison mechanism also comprises the present invention. This comparison mechanism will remove blanks, punctuation and numeric characters before compressing both fields and then comparing those fields. In this close alpha comparison mechanism, one transposition will not be fatal to the comparison and the letters "E" and "O" are equal.

The present invention further comprises an alternative equality comparison mechanism where not only are equal fields found as positive matches, but any field compared to a blank fields will also return a positive match. Yet another comparison mechanism comprising the present invention is a compressed mode comparison in which all blanks and punctuation characters are removed and both fields compressed before comparing for equality.

In cases where a numeric comparison is required, the present invention comprises a single transposition tolerant equality mechanism. The invention also comprises a right justified numeric comparison that isolates numeric characters and then compares the right most numeric characters in each of two fields from two records being compared.

A very unique comparison mechanism that is tolerant of one character transposition and returns a match when the two fields from the two records match or the two record fields contain blanks also comprises the present invention. This mechanism will return a negative, mismatch condition if a non-blank field is compared to a blank field.

The present invention further comprises a not-equal comparison mechanism. The not-equal comparison mechanism will return a match condition where the fields being compared don't match and a match indication where the fields do not match.

Yet another comparison mechanism comprising the present embodiment checks to determine if two records contain nick-names of each other. This mechanism returns a positive match where one record contains a name or an initial and the second record contains either that name or initial or a nickname for the name found in the first record. This mechanism is embodied in an enhanced version that includes a gender code appended to the name and/or initial.

The present invention further comprises a means to compare two corresponding fields from two records in a phonetic and in a reverse phonetic manner. The present invention also comprises an alphanumeric comparison mechanism that allows for one transposition error.

BRIEF DESCRIPTION OF THE DRAWINGS

The foregoing aspects are better understood from the following detailed description of one embodiment of the invention with reference to the drawings, in which:

FIG. 2 is a table that depicts the structure of the parameter block;

FIG. 3 is a table that depicts the structure of the matching table;

DETAILED DESCRIPTION OF THE INVENTION

A computer application is normally the process that effects the identification of records that may be duplicates of each other. However, as has already been discussed supra, there is no suitable prior art that can identify records that are not exact matches. The present invention is a method and an apparatus that enables the identification of records that are potentially replicas of each other. The present invention uses a scoring method that compares the equivalence of each field in two records being compared and then decides equivalence based on an aggregate score based on all of the fields.

Overview

The present invention comprises a suite of software subroutines that can be called from an application program. In the preferred embodiment, there are three application-callable routines. These comprise an initialization routine; a matching function; and a termination function.

In use, an application program calls the initialization function to specify a set of records that need to be compared together with a set of matching criteria. The application program can then call the matching function in order to identify duplicates. This will permit a user written application to identify duplicates between transactions and a database without having to process the entire database. The termination function cleans up any data structures used in the matching process and then creates a report documenting the results of the matching operation.

The matching function is called with a list of records to consider. It then applies matching criteria and scores the correlation of each field to the corresponding field in a known data set. Finally, the matching function returns a list of the matching records. The termination call cleans up storage at the end of the job and finishes the reports.

Initialization Function

Figure 1:
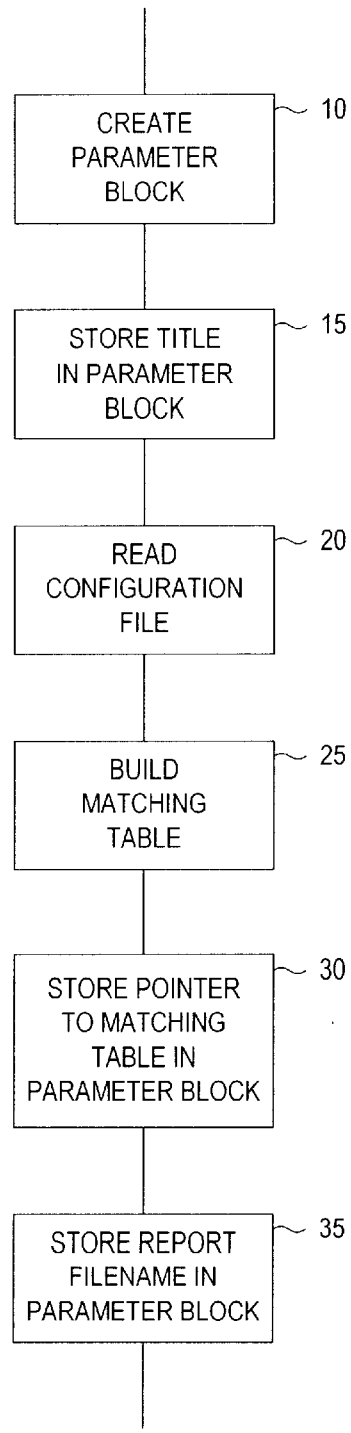
FIG. 1 is a flow diagram that depicts the method steps performed by the initialization function.

FIG. 1 is a flow diagram that depicts the method steps performed by the initialization function. The initialization function is called with three parameters, being:

title of search;

name of configuration file; and name of report file.

In step 10, the initialization function creates a parameter block, the details of which will be discussed further. Having been called with a parameter defining the title for the instant comparison, the initialization function stores the title parameter in the parameter block (step 15). Once the title has been saved, the initialization function reads a configuration file according to the file name it receives as a parameter (step 20). The configuration file contains matching rules for each field in the transaction record. These matching rules are then set forth in a matching table (step 25). A reference to the matching table is then stored in the parameter block (step 30). Finally, the initialization function stores the filename that will subsequently be used to write a report detailing the results of the comparison procedure (step 35). This report filename, which is received as a parameter from the calling application program, is also stored in the parameter block.

FIG. 2 is a table that depicts the structure of the parameter block. The parameter block 40 comprises a plurality of fields including, but not necessarily limited to title 45; configuration 50; report 55; and matching table 60. It should be noted that each call to the initialization function will request an allocation of new memory for the creation of a new parameter block so that a plurality of comparison procedures can be performed simultaneously. Of course, the term simultaneous refers to the notion that an underlying operating system will schedule a plurality of comparison processes that must all compete for processing resources.

The title field 45 is used to store an alphanumeric representation, normally as ASCII text, of the title that is to be affiliated with the present instantiation of the comparison function.

The configuration field 50 is used to store an alphanumeric representation, also normally stored as ASCII text, of a filename that the initialization function will use to access a file containing matching criteria.

The report field 55 is used to store an alphanumeric representation, also normally stored as ASCII text, of a filename that the termination function will use to create a file containing a report detailing the results of a comparison.

The matching table field 60 I used to store a reference to a matching table that the initialization function builds after having obtained matching criteria from the configuration file.

FIG. 3 is a table that depicts the structure of the matching table. The matching table 65 is used to store matching criteria read from the configuration file specified during initialization. The matching table 65 comprises a plurality of records 70 each of which further comprises the following fields: field name 75; compare type 80; positive score 85; negative score 90; and transaction value 95.

During initialization, the initialization function requests a block of memory from the operating system large enough to accommodate the match table 65. By reading the configuration file, the initialization function will enter field names into each of a plurality of records 70 in the matching table 65. Each field name 75 is further defined by a comparison mechanism that is used to test a transaction record against one of a plurality of legacy records. From the standpoint of convention, the transaction record is a record that is as yet not stored in the application database. Legacy records are records that exist in the database used by the application program.

The matching criteria for each field defined in the matching database 65 further comprises a positive value 85 and a negative value 90. The positive value 85 is obtained from the configuration file and is used as the positive score for that field when a comparison results in a match for that field. The negative value 90 is used as the negative score for that field when a comparison results in a mismatch for that field. By assigning distinct scores for each score in a comparison, an implicit weighting of each field in any resultant aggregate score is achieved. Two additional fields, positive score 95 and negative score 97, are used during comparison activities.

Figure 4:
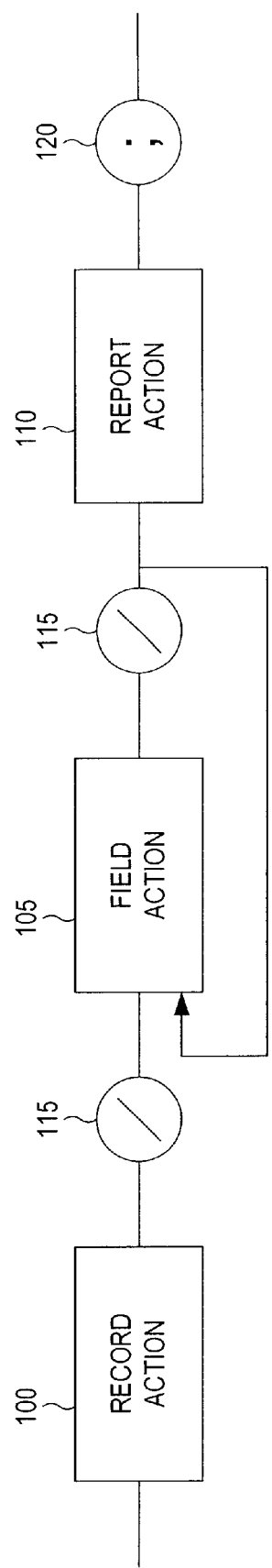
FIG. 4 is a syntax diagram that depicts the lexical structure of the configuration file.

FIG. 4 is a syntax diagram that depicts the lexical structure of the configuration file. A configuration file, as read by the initialization function, comprises a record action; a plurality of field actions 105; and a report action 110. Each of these is delimited by an action separation token 115. In the present embodiment, the separation token 115 is a forward slash character ("/"). The configuration file concludes with a termination token 120.

Figure 5:
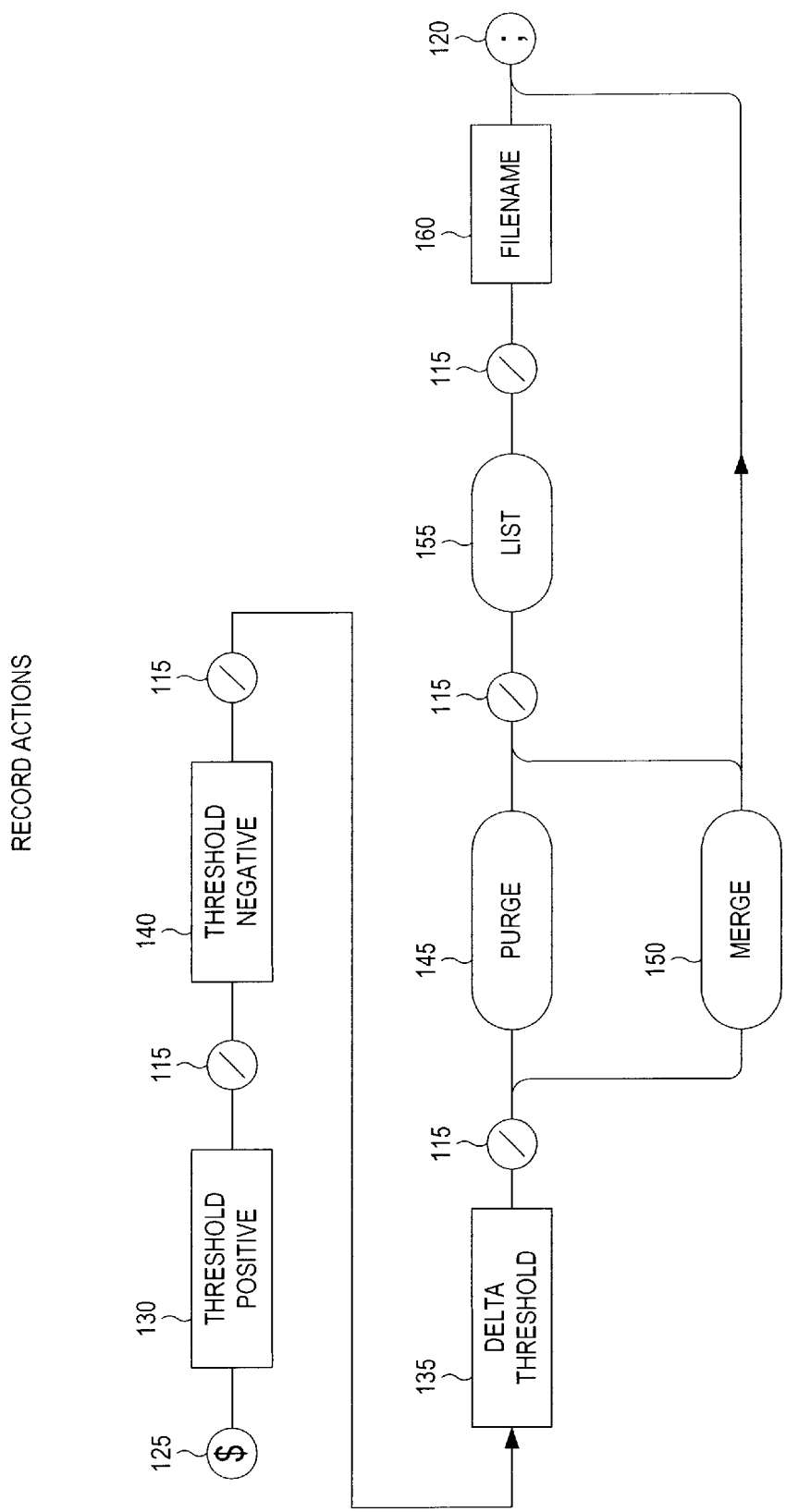
FIG. 5 is a syntax diagram that depicts the lexical structure of the record action.

FIG. 5 is a syntax diagram that depicts the lexical structure of the record action. The record action 100 is comprised of a record action start token 125 followed by a positive threshold 130, a negative threshold 135 and a delta threshold 140. The start token identifies the action as a record action. The start token used here is a dollar sign ("$"). A delimiter 115 separates each of these. Immediately following the thresholds, the record action comprises either a purge token 145 or a merge token 150. The purge and merge tokens server as directives to the matching function and indicate if the transaction record should be purged from the legacy database or merged there into. The present invention does not specifically perform the purge or merge of the transaction record. Rather, these directives serve as section headers that are subsequently included in the output report (see infra). The record action is terminated by a termination token 120.

In one alternative embodiment, a target directive 155 and a target filename 160 can optionally follow the purge and merge directives. In this case, subsequent comparison actions will directly merge the transaction record into a target database specified by the target filename 160. A delimiter 115 is used to separate the varied tokens and symbols found in the record action syntax. When a transaction record is purged, it is simply not merged into the target database.

Figure 6:
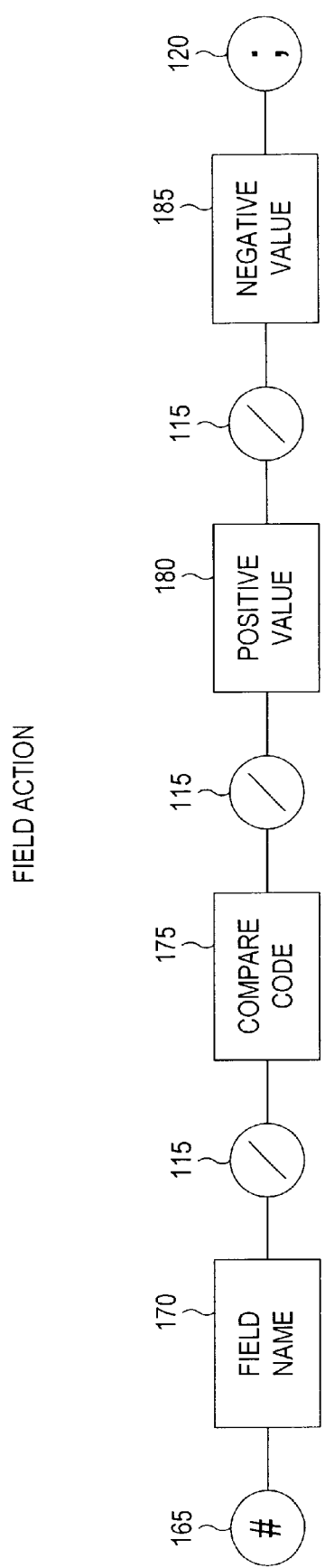
FIG. 6 is a syntax diagram that depicts the lexical structure of the field action.

FIG. 6 is a syntax diagram that depicts the lexical structure of the field action. Each field action starts with a start token 165 that identifies the action as a field action. The syntax diagram shown in FIG. 6 indicates that symbols for field name 170, compare code 175, positive value 180, and negative value 185 all follow the field action start token 165 and are separated by a delimiter 115. A termination token 120 concludes the field action. The symbols for field name 170, positive value 180 and negative value 185 are constructed in traditional expression fashion for text and numeric syntax. The compare code comprises one of a plurality of tokens that correspond to a plurality of comparison mechanisms integral to the present invention.

Figure 7:
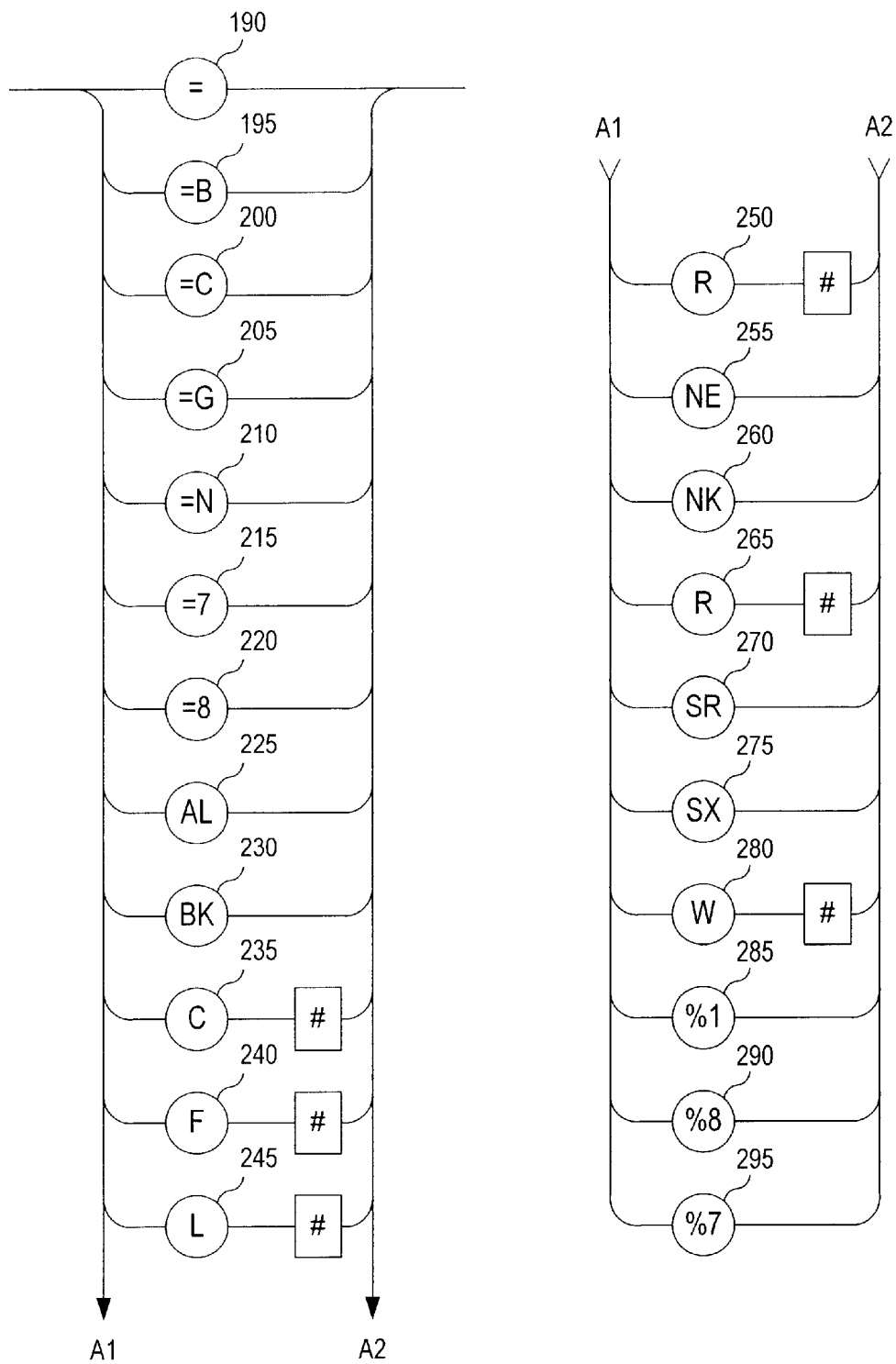
FIG. 7 is a syntax diagram that depicts the lexical structure of the compare code.

FIG. 7 is a syntax diagram that depicts the lexical structure of the compare code. The compare code for each field action comprises one of a plurality of tokens that correspond to one of a plurality of comparison mechanisms. These are enumerated in the table below:

| Compare Code Token | Description Function | Reference |
|---|---|---|
| = | Compare for equality if both fields are non-blank. | 190 |
| =B | Compare for equality even if the field(s) are blank. | 195 |
| =C | Remove blanks and punctuation, then compare for equality. | 200 |
| =G | Compare gender code for equality. | 205 |
| =N | Compare name and gender code for equality. | 210 |
| =7 | Translate to numeric equivalents and compare if both fields are non-blank. | 215 |
| =8 | Compress blanks and special characters then compare the shorter of the data lengths. | 220 |
| AL | Close alpha compare. Remove blanks, punctuation, and numerics. Allow one transposition, "E" and "0" are equal. | 225 |
| BK | Compare for equality, allow blanks to a value to be equal. | 230 |
| C | Remove blanks and punctuation, compress, then compare left most characters. | 235 |
| F | Compare numerics only. Allow one transposition. | 240 |
| L | Isolate the right-most numerics and compare. | 245 |
| N | Compare numerics only. Allow one transposition. Blanks compared to a value are assigned a negative score and blanks compared to blanks are assigned a positive score. | 250 |
| NE | Compare for inequality if both fields are non-blank. | 255 |
| NK | Compare first names for matches using nicknames, initials and full first names. | 260 |
| R | Right justify and compare. | 265 |
| SR | Reverse field order and compare phonetically. | 270 |
| SX | Compare fields phonetically. | 275 |
| W | Close alpha/numeric compare. Allow one transposition. | 280 |
| %1 | Compare for equality up to the first blank if both fields are non-blank. | 285 |

-continued

| Compare Code Token | Description Function | Reference |
|---|---|---|
| %8 | Determine shorter of the two fields and compare for the length of the shorter field for equality. | 290 |
| %7 | Translate both fields to their numeric equivalents and compare for near-match. | 295 |

Matching Function

Comparison of records is accomplished using the matching function. The matching function is called by the application program using three parameters being:
  reference to parameter block;
  reference to transaction record; and
  reference to legacy records.

The reference to the parameter block indicates to the matching function which matching criteria to user based on the reference to a matching table 65 found in the parameter block 40.

The present invention is a merge or purge system that uses score-based matching conditions between records. The scores for matches and mismatches are based on values set by the user in a configuration file. Hence, the present invention can use a large number of user specified criteria to identify match conditions between records in a database. Because the matching system relies on scores, an implicit weighting of certain fields in the records can be helpful in confirming otherwise less than certain matches. The present invention allows a plurality of matching procedures to exist simultaneously. This is done by calling the initialization function numerous times, where each instantiation of the initialization function is dispatched with a distinct match title 45. This plurality of simultaneous match procedures results in multiple views of a database file, further aiding the identification of duplicates.

The scoring process embodied in the present invention is user-controlled and table-driven. Based on scores set in the matching table 65, the matching function assigns a positive score to a matching condition and a negative score to a non-matching condition. The user can modify the scores in the table as needed, depending on the results desired or the types of source files used.

The present invention subjects each field in the record to the matching process, including fields that contain valid data on only a small percentage of the records. In an illustrative example, such fields may include a persons social security number, telephone number, or account number. These fields can be used to identify matches definitively. In other applications, fields could include date of birth and sales territory. Some application could use these types of fields as further evidence in confirming a matching or non-matching condition that could not be conclusively decided otherwise. The application program would then adjust the score values for positive 85 and negative 90 in the matching table 65 by means of the configuration file loaded by the initialization function.

The application program using the matching routines that comprise the present invention can develop load groups. Every record in the load group is then compared against a transaction record. If there were any matches against the transaction record, then every other record in the load group is compared against all other records in the load group. Reported duplicates are either records that matched the transaction or records that match a record already matching the transaction. The transaction record is conveyed to the matching function as a reference using the transaction record parameter (see supra). The load group is conveyed to the matching function as a reference to a linked list of legacy records.

Figure 8:
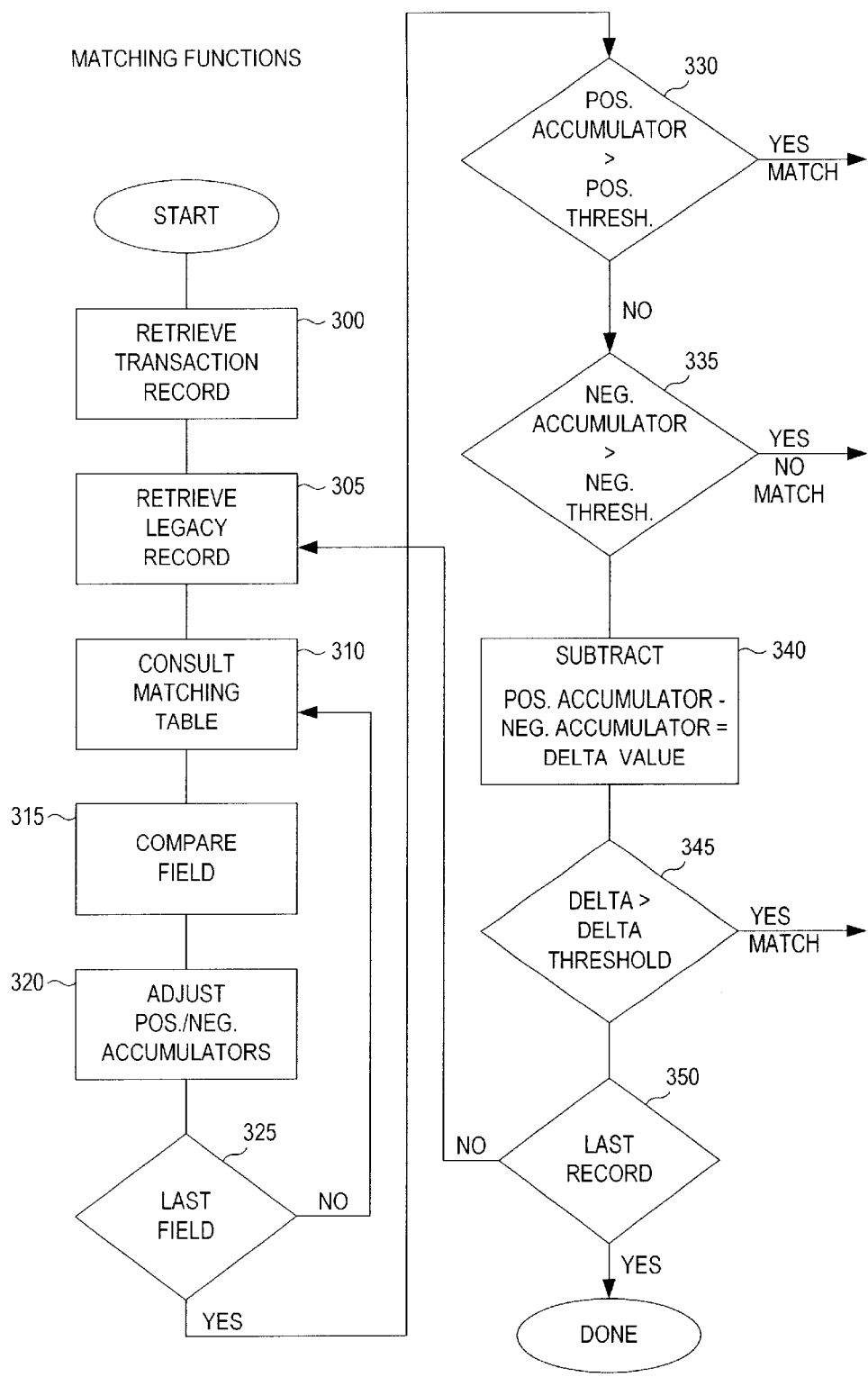
FIG. 8 is a flow diagram that depicts the operation of the matching function.
Figure 9:
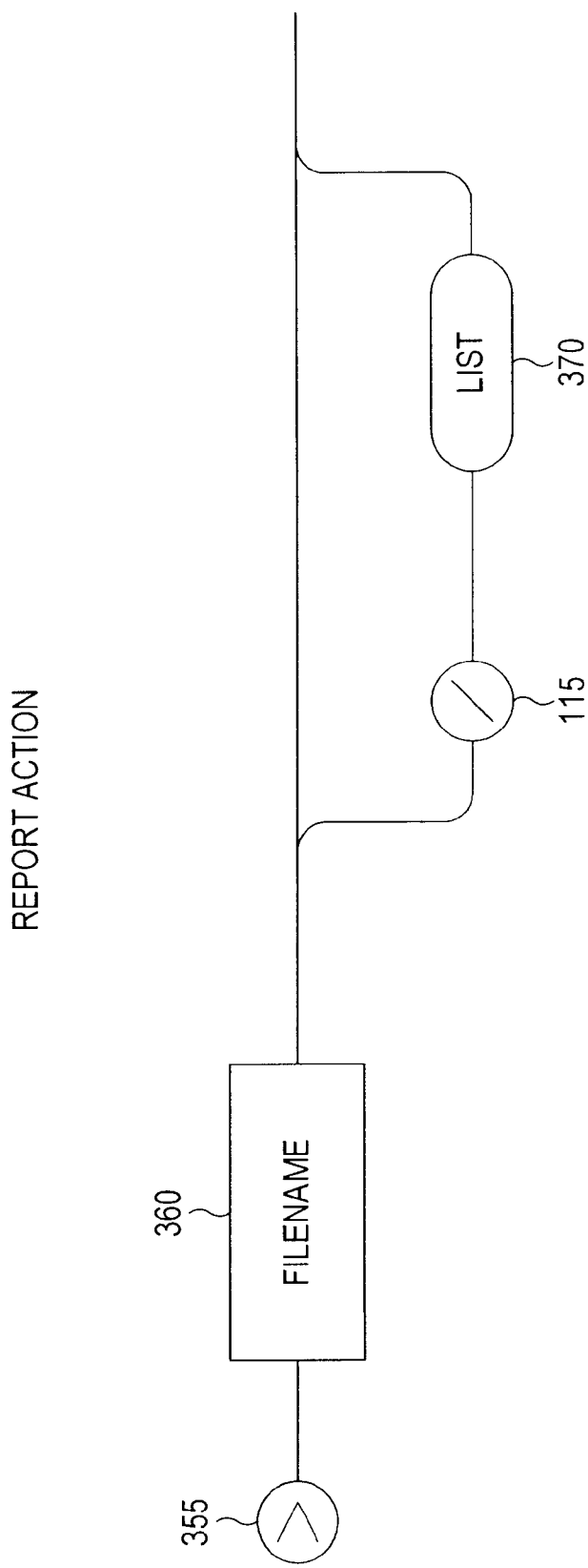
FIG. 9 is a syntax diagram that depicts the lexical structure of the report action.

FIG. 8 is a flow diagram that depicts the operation of the matching function. The flow diagram of FIG. 8 is repeated for every record in the load group submitted to the matching function. The matching function uses the transaction reference parameter to retrieve the transaction record (step 300). Using a reference from the linked list of legacy records, the matching function then retrieves a legacy record. It should be noted that the matching function manages the linked list of legacy records even though this common and well known linked list management process is not specifically described in this text. Using the matching table 65, the matching function determined the matching criteria to be imposed on the two records (step 310).

The matching function then performs a comparison of the first field specified in the matching table (step 315). The matching function maintains two accumulators, one for positive scores and a second for negative scores. As a result of the comparison, the matching function adjusts the positive and negative accumulators. When a field matches, the positive accumulator is incremented by the score value specified in the matching table 65 for that field 85. Likewise, when a mismatch is declared, the negative accumulator is incremented by the score value specified in the matching table 65 for that field 90. The matching function then determines if there are any other fields that must be compared (step 325).

Once all of the fields between two records have been compared, the matching function compares the value of the positive accumulator to a first positive threshold (step 330). If the positive accumulator exceeds the positive threshold a match is declared. The positive threshold is specified in the configuration file through the record action symbol 100.

If a definitive match is not found (as in step 330), then the matching function compares the value stored in the negative accumulator to a second negative threshold (step 335). If the negative accumulator exceeds the negative threshold a mismatch is declared. The negative threshold is also specified in the configuration file through the record action symbol 100.

In the event that a definitive mismatch is not found, then the value of the negative accumulator is subtracted from the value of the positive accumulator (step 340). This difference is referred to as a delta value. The delta value is then compared against a delta threshold (step 345). If the delta value exceeds the delta threshold, a match is then declared. This comparison process is repeated for every legacy record specified by the application program calling the matching function (step 350).

Termination Function

Once an application program no longer needs the matching criteria specified through the use of the initialization function, it must call the termination function.

Comparison Mechanisms

The foregoing description of the matching function refers to a comparison of fields between two records. The actual comparison mechanism used for a field is specified in the configuration file according to the syntax of the compare code 175 within the field action 105. A plurality of comparison mechanisms are incorporated into the present embodiment of this invention. The specific action of these comparison mechanisms is specified herein. All example comparisons are for illustration only and are not to be construed as limiting the scope of the claimed invention.

Compare Code "="

The equal comparison mechanism compares the fields between two records for an exact match only when both fields contain valid (non-blank) data.

Positive Score Example

A positive score would result from the comparison set forth immediately below. The positive value 85 specified in the matching table 65 for the particular field would be added to the positive accumulator.

| Transaction | J | O | H | N |   | J | O | H | N | S | O | N |
|---|---|---|---|---|---|---|---|---|---|---|---|---|
| Legacy | J | O | H | N |   | J | O | H | N | S | O | N |

Negative Score Example

A negative score would result from the comparison set forth immediately below. The negative value 90 specified in the matching table 65 for the particular field would be added to the negative accumulator.

| Transaction | J | . |   |   | J | O | H | N | S | O | N |
|---|---|---|---|---|---|---|---|---|---|---|---|
| Legacy | J | O | H | N |   | J | O | H | N | S | O | N |

Null Score Example

A negative score would result from the comparison set forth immediately below. Neither the positive nor the negative accumulators are incremented as a result of a null score.

| Transaction |   |   |   |   |   |   |   |   |   |   |   |   |
|---|---|---|---|---|---|---|---|---|---|---|---|---|
| Legacy | J | O | H | N |   | J | O | H | N | S | O | N |

Compare Code "=B"

The equal-B comparison mechanism compares the fields between two records for an exact match. This mechanism compares the fields for an equality match, where blank is considered to be a normal character.

Positive Score Example

A positive score would result from the comparison set forth immediately below. The positive value 85 specified in the matching table 65 for the particular field would be added to the positive accumulator.

| Transaction | J | O | H | N |   | J | O | H | N | S | O | N |
|---|---|---|---|---|---|---|---|---|---|---|---|---|
| Legacy | J | O | H | N |   | J | O | H | N | S | O | N |

Or, where both record fields are blank:

| Transaction |
|---|
| Legacy |

Negative Score Example

A negative score would result from the comparison set forth immediately below. The negative value 90 specified in the matching table 65 for the particular field would be added to the negative accumulator.

| Transaction | J | . |   |   | J | O | H | N | S | O | N |
|---|---|---|---|---|---|---|---|---|---|---|---|
| Legacy | J | O | H | N |   | J | O | H | N | S | O | N |

Null Score Example

A null score is not applicable.

Compare Code "=C"

The equal-C comparison mechanism compares fields for equality only when both fields contain valid (non-blank) data. Prior to making the comparison, blanks and punctuation character are removed. The fields are then compressed.

Positive Score Example

A positive score would result from the comparison set forth immediately below. The positive value 85 specified in the matching table 65 for the particular field would be added to the positive accumulator.

| Transaction | P | . | O | . |   | B | O | X |   | 9 | 3 | 8 |
|---|---|---|---|---|---|---|---|---|---|---|---|---|
| Legacy | P | O |   |   | B | O | X |   | 9 | 3 | 8 |   |

Negative Score Example

A negative score would result from the comparison set forth immediately below. The negative value 90 specified in the matching table 65 for the particular field would be added to the negative accumulator.

| Transaction | P | . | O | . |   | B | O | X | 9 | 3 | 8 |
|---|---|---|---|---|---|---|---|---|---|---|---|
| Legacy | B | O | X | 9 | 3 | 8 |   |   |   |   |   |

Null Score Example

A negative score would result from the comparison set forth immediately below. Neither the positive nor the negative accumulators are incremented as a result of a null score.

| Transaction |   |   |   |   |   |   |
|---|---|---|---|---|---|---|
| Legacy | B | O | X | 9 | 3 | 8 |

Compare Code "=G"

The equal-G comparison mechanism compares two fields that contain a Gender code. A comparison for equality is only made when both fields contain valid (non-blank) data.

Positive Score Example

A positive score would result from the comparison set forth immediately below. The positive value 85 specified in the matching table 65 for the particular field would be added to the positive accumulator.

| Transaction | F |
|---|---|
| Legacy | F |

Negative Score Example

A negative score would result from the comparison set forth immediately below. The negative value 90 specified in the matching table 65 for the particular field would be added to the negative accumulator.

| Transaction | F |  |  |  |  |  |  |  |  |  |  |  |
|---|---|---|---|---|---|---|---|---|---|---|---|---|
| Legacy | M |  |  |  |  |  |  |  |  |  |  |  |

Null Score Example

A negative score would result from the comparison set forth immediately below. Neither the positive nor the negative accumulators are incremented as a result of a null score.

| Transaction |  |  |  |  |  |  |  |  |  |  |  |  |
|---|---|---|---|---|---|---|---|---|---|---|---|---|
| Legacy | M |  |  |  |  |  |  |  |  |  |  |  |

Compare Code "=N"

The equal-G comparison mechanism compares two fields that contain the first three characters of a first name and a one character gender code. The equality comparison is only made when both fields contain valid (non-blank) data. In the record layout the field defined contains the first name for a length of 3 followed by the gender code for a length of 1.

Positive Score Example

A positive score would result from the comparison set forth immediately below. The positive value 85 specified in the matching table 65 for the particular field would be added to the positive accumulator.

| Transaction | P | A | T | F |  |  |  |  |  |  |  |  |
|---|---|---|---|---|---|---|---|---|---|---|---|---|
| Legacy | P | A | T | F |  |  |  |  |  |  |  |  |

Negative Score Example

A negative score would result from the comparison set forth immediately below. The negative value 90 specified in the matching table 65 for the particular field would be added to the negative accumulator.

| Transaction | P | A | T | F |  |  |  |  |  |  |  |  |
|---|---|---|---|---|---|---|---|---|---|---|---|---|
| Legacy | P | A | T | M |  |  |  |  |  |  |  |  |

Null Score Example

A negative score would result from the comparison set forth immediately below. Neither the positive nor the negative accumulators are incremented as a result of a null score.

| Transaction |  |  |  |  |  |  |  |  |  |  |  |  |
|---|---|---|---|---|---|---|---|---|---|---|---|---|
| Legacy | P | A | T | F |  |  |  |  |  |  |  |  |

Compare Code "=7"

The equal-7 comparison mechanism compares two fields after having first converted both fields to their numeric equivalents. An equality test is only performed when both fields contain valid (non-blank) data. A table of numeric equivalents is presented infra.

Positive Score Example

A positive score would result from the comparison set forth immediately below. The positive value 85 specified in the matching table 65 for the particular field would be added to the positive accumulator.

| Transaction | K | I | M |  | A | . |  | A | N | D | R | E | W | S |  |  |
|---|---|---|---|---|---|---|---|---|---|---|---|---|---|---|---|---|
| Legacy | M | I | K | E |  | A | N | D | R | E | W | S |  |  |  |  |

The numeric equivalent of "KIM A. ANDREWS" and "MIKE ANDREWS" are both equal to 2276.

Negative Score Example

A negative score would result from the comparison set forth immediately below. The negative value 90 specified in the matching table 65 for the particular field would be added to the negative accumulator.

| Transaction | K | I | M |  | A | . |  | A | N | D | R | E | W | S |  |  |
|---|---|---|---|---|---|---|---|---|---|---|---|---|---|---|---|---|
| Legacy | K | I | M |  | A | N | D | R | E | W | S | O | N |  |  |  |

Null Score Example

A negative score would result from the comparison set forth immediately below. Neither the positive nor the negative accumulators are incremented as a result of a null score.

| Transaction |  |  |  |  |  |  |  |  |  |  |  |  |  |  |
|---|---|---|---|---|---|---|---|---|---|---|---|---|---|---|
| Legacy | K | I | M |  | A | N | D | R | E | W | S | O | N |  |  |

Compare Code "=8"

The equal-8 comparison mechanism compares two fields after first Removing blanks and special characters and then compressing the fields. This comparison mechanism then determines the shorter of the two fields and compares the fields for equality using the shorter of the two fields. Comparisons are only made when both fields contain valid (non-blank) data.

Positive Score Example

A positive score would result from the comparison set forth immediately below. The positive value 85 specified in the matching table 65 for the particular field would be added to the positive accumulator.

| Transaction | J | . |  | S | T | E | V | E | N | S |  |  |  |  |
|---|---|---|---|---|---|---|---|---|---|---|---|---|---|---|
| Legacy | J | . |  | S | T | E | V | E | N | S | O | N |  |  |

Negative Score Example

A negative score would result from the comparison set forth immediately below. The negative value 90 specified in the matching table 65 for the particular field would be added to the negative accumulator.

| Transaction | J | . |  | S | T | E | E | V | E | S |  |  |  |  |
|---|---|---|---|---|---|---|---|---|---|---|---|---|---|---|
| Legacy | J | . | S | T | E | V | E | N | S | O | N |  |  |  |

Null Score Example

A negative score would result from the comparison set forth immediately below. Neither the positive nor the negative accumulators are incremented as a result of a null score.

| Transaction Legacy | J | . | S | T | E | V | E | N | S | O | N |
|---|---|---|---|---|---|---|---|---|---|---|---|

Compare Code "AL"

The AL comparison mechanism compares two fields for a close alpha match when both fields contain valid (non-blank) data. This comparison mechanism first removes numeric, blank, and punctuation characters before compressing the fields. The letters E and O are treated as identical. The AL compare allows for one transposition of characters. This test is case sensitive.

Positive Score Example

A positive score would result from the comparison set forth immediately below. The positive value 85 specified in the matching table 65 for the particular field would be added to the positive accumulator.

| Transaction | O | ' | B | R | I | E | N |
|---|---|---|---|---|---|---|---|
| Legacy | O | | B | R | E | I | N |
| OR | | | | | | | |
| Transaction | L | A | R | S | O | N | |
| Legacy | L | A | R | S | E | N | |

Negative Score Example

A negative score would result from the comparison set forth immediately below. The negative value 90 specified in the matching table 65 for the particular field would be added to the negative accumulator.

| Transaction | O | ' | B | R | I | E | N |
|---|---|---|---|---|---|---|---|
| Legacy | O | ' | B | R | I | I | N |

Null Score Example

A negative score would result from the comparison set forth immediately below. Neither the positive nor the negative accumulators are incremented as a result of a null score.

| Transaction Legacy | O | ' | B | R | I | I | N |
|---|---|---|---|---|---|---|---|

Compare Code "BK"

The BK comparison mechanism compares two fields for equality. Positive points are assigned when a value is compared to a blank.

Positive Score Example

A positive score would result from the comparison set forth immediately below. The positive value 85 specified in the matching table 65 for the particular field would be added to the positive accumulator.

| Transaction | M | A | I | N | S | T | . |
|---|---|---|---|---|---|---|---|
| Legacy | M | A | I | N | S | T | . |
| OR | | | | | | | |
| Transaction | M | A | I | N | S | T | . |
| Legacy | | | | | | | |

Negative Score Example

A negative score would result from the comparison set forth immediately below. The negative value 90 specified in the matching table 65 for the particular field would be added to the negative accumulator.

| Transaction | M | A | I | N | S | T | . |
|---|---|---|---|---|---|---|---|
| Legacy | L | E | X | I | N | G | T | O | N | A | V | E | . |

Null Score Example

A null score is not applicable.

Compare Code "C#"

The C# comparison mechanism compares two fields for a match when both fields contain valid (non-blank) data. This comparison mechanism first removes blanks and punctuation characters before compressing the fields. The syntax of the C# comparison is comprised of the "C" token and a symbol reflecting the length of the comparison. The length token, also referred to as "#", is a single numeric digit and can take on the value of 0 through nine, inclusive. Where the length token is set to zero (0), the C# comparison will compare ten character positions in the two fields compared. Otherwise, the length compared is defined by the value of the length symbol.

Positive Score Example

A positive score would result from the comparison set forth immediately below. The positive value 85 specified in the matching table 65 for the particular field would be added to the positive accumulator.

| Transaction | 1 | 2 | 3 | V | A | N | | S | T | R | I | K | E |
|---|---|---|---|---|---|---|---|---|---|---|---|---|---|
| Legacy | 1 | 2 | 3 | V | A | N | S | T | R | I | K | E | |

Negative Score Example

A negative score would result from the comparison set forth immediately below. The negative value 90 specified in the matching table 65 for the particular field would be added to the negative accumulator.

| Transaction | 1 | 2 | 3 | V | A | N | S | T | R | I | K | E |
|---|---|---|---|---|---|---|---|---|---|---|---|---|
| Legacy | 1 | 2 | 3 | V | A | N | S | T | R | Y | K | E |

Null Score Example

A negative score would result from the comparison set forth immediately below. Neither the positive nor the negative accumulators are incremented as a result of a null score.

| Transaction | | | | | | | | | | | |
|---|---|---|---|---|---|---|---|---|---|---|---|
| Legacy | 1 | 2 | 3 | V | A | N | S | T | R | Y | K E |

Compare Code "F#"

The F# comparison mechanism compares two fields for a match when both fields contain valid (non-blank) data. This comparison mechanism first removes non-numeric and punctuation characters but will retain blanks (i.e. white space). Where the letter 'O' is encountered, it is replaced by a zero. This comparison mechanism will extract a numeric value from the first word and will discard all numeric characters after the first number encountered. Leading blanks and zeros are ignored, but a blank signifies the end of the first number in the field. The F# comparison will remove adjacent duplicate numeric characters and will return a positive match if the two fields compared differ as a result of a single transposition error. The syntax of the F# comparison is comprised of the "F" token and a symbol reflecting the length of the comparison. The length token, also referred to as "#", is a single numeric digit and can take on the value of 0 through nine, inclusive. Where the length token is set to zero (0), the F# comparison will compare ten character positions in the two fields compared. Otherwise, the length compared is defined by the value of the length symbol.

Positive Score Example

A positive score would result from the comparison set forth immediately below. The positive value 85 specified in the matching table 65 for the particular field would be added to the positive accumulator.

| Transaction | 1 | 1 | 2 | 3 | 4 |
|---|---|---|---|---|---|
| Legacy | 1 | 2 | 3 | 4 | |
| Or | | | | | |
| Transaction | 1 | 8 | A | | |
| Legacy | 1 | 8 | | | |
| Or | | | | | |
| Transaction | 1 | 8 | 0 | | |
| Legacy | 1 | 8 | O | | |
| Or | | | | | |
| Transaction | 1 | 3 | 2 | 4 | |
| Legacy | 1 | 2 | 3 | 4 | |

Negative Score Example

A negative score would result from the comparison set forth immediately below. The negative value 90 specified in the matching table 65 for the particular field would be added to the negative accumulator.

| Transaction | 2 | 3 | 4 | 5 | | | | | | | | | |
|---|---|---|---|---|---|---|---|---|---|---|---|---|---|
| Legacy | 1 | 2 | 3 | 4 | | | | | | | | | |

Or

| Transaction | 1 | 1 | 5 | 3 | 5 | | 1 | 2 | T | H | | S | T | |
|---|---|---|---|---|---|---|---|---|---|---|---|---|---|---|
| Legacy | 1 | 2 | | | | | | | | | | | | |

Or

| Transaction | 1 | 2 | 3 | 4 | 5 | | | | | | | | | |
|---|---|---|---|---|---|---|---|---|---|---|---|---|---|---|
| Legacy | 1 | 2 | 3 | 4 | | | | | | | | | | |

Or

| Transaction | 1 | 2 | 3 | 4 | 5 | | | | | | | | | |
|---|---|---|---|---|---|---|---|---|---|---|---|---|---|---|
| Legacy | 1 | 3 | 2 | 5 | 4 | | | | | | | | | |

Or

| Transaction | 1 | 2 | 3 | 4 | 5 | | | | | | | | | |
|---|---|---|---|---|---|---|---|---|---|---|---|---|---|---|
| Legacy | 1 | 3 | 2 | 5 | 4 | | | | | | | | | |

Or

| Transaction | W | E | S | T | | 1 | 2 | 3 | 4 | | S | T | | |
|---|---|---|---|---|---|---|---|---|---|---|---|---|---|---|
| Legacy | 1 | 2 | 3 | 4 | | | | | | | | | | |

Null Score Example

A negative score would result from the comparison set forth immediately below. Neither the positive nor the negative accumulators are incremented as a result of a null score.

| Transaction | | | | | | | | | | | | | | |
|---|---|---|---|---|---|---|---|---|---|---|---|---|---|---|
| Legacy | 1 | 2 | 3 | 4 | 5 | | | | | | | | | |

Compare Code "L#"

The L# comparison mechanism compares two fields for a match when both fields contain valid (non-blank) data. This comparison mechanism isolates the right most number in the two fields and compares those for equality. The syntax of the L# comparison is comprised of the "L" token and a symbol reflecting the length of the comparison. The length token, also referred to as "#", is a single numeric digit and can take on the value of 0 through nine, inclusive. Where the length token is set to zero (0), the L# comparison will compare ten character positions in the two fields compared. Otherwise, the length compared is defined by the value of the length symbol.

Positive Score Example

A positive score would result from the comparison set forth immediately below. The positive value 85 specified in the matching table 65 for the particular field would be added to the positive accumulator.

| Transaction | P | O | B | O | X | | 9 | 3 | 8 | | | | | |
|---|---|---|---|---|---|---|---|---|---|---|---|---|---|---|
| Legacy | 9 | 3 | 8 | | H | O | P | E | | S | T | . | | |

Negative Score Example

A negative score would result from the comparison set forth immediately below. The negative value 90 specified in the matching table 65 for the particular field would be added to the negative accumulator.

| Transaction | P | O | B | O | X | | 9 | 3 | 8 | | | | | |
|---|---|---|---|---|---|---|---|---|---|---|---|---|---|---|
| Legacy | 9 | 3 | 8 | | H | O | P | E | , | # | 2 | | | |

Null Score Example

A negative score would result from the comparison set forth immediately below. Neither the positive nor the negative accumulators are incremented as a result of a null score.

| Transaction | P | O | B | O | X | | 9 | 3 | 8 | | | | | |
|---|---|---|---|---|---|---|---|---|---|---|---|---|---|---|
| Legacy | | | | | | | | | | | | | | |

Compare Code "N#"

The N# comparison mechanism compares two fields for a match when both fields contain valid (non-blank) data. This comparison mechanism first removes non-numeric and punctuation characters but will retain blanks (i.e. white space). Where the letter 'O' is encountered, it is replaced by a zero. This comparison mechanism will extract a numeric value from the first word and will discard all numeric characters after the first number encountered. Leading blanks and zeros are ignored, but a blank signifies the end of the first number in the field. The N# comparison will remove adjacent duplicate numeric characters and will return a positive match if the two fields compared differ as a result of a single transposition error. The N# comparison mechanism will assign positive points where two blank fields are compared. Negative points are assigned is a non-blank value is compared to a blank field. The syntax of the N# comparison is comprised of the "N" token and a symbol reflecting the length of the comparison. The length token, also referred to as "#", is a single numeric digit and can take on the value of 0 through nine, inclusive. Where the length token is set to zero (0), the N# comparison will compare ten character positions in the two fields compared. Otherwise, the length compared is defined by the value of the length symbol.

Positive Score Example

A positive score would result from the comparison set forth immediately below. The positive value 85 specified in the matching table 65 for the particular field would be added to the positive accumulator.

| Transaction | 1 | 1 | 2 | 3 | 4 | | | | | | | | | |
|---|---|---|---|---|---|---|---|---|---|---|---|---|---|---|
| Legacy | 1 | 2 | 3 | 4 | | | | | | | | | | |

Or

| Transaction | 1 | 8 | A | | | | | | | | | | | |
|---|---|---|---|---|---|---|---|---|---|---|---|---|---|---|
| Legacy | 1 | 8 | | | | | | | | | | | | |

Or

| Transaction | 1 | 8 | 0 | | | | | | | | | | | |
|---|---|---|---|---|---|---|---|---|---|---|---|---|---|---|
| Legacy | 1 | 8 | O | | | | | | | | | | | |

Or

-continued

| Transaction | 1 | 3 | 2 | 4 | | | | | | | | | | |
|---|---|---|---|---|---|---|---|---|---|---|---|---|---|---|
| Legacy | 1 | 2 | 3 | 4 | | | | | | | | | | |

Or

| Transaction | | | | | | | | | | | | | | |
|---|---|---|---|---|---|---|---|---|---|---|---|---|---|---|
| Legacy | | | | | | | | | | | | | | |

Or

| Transaction | 0 | 0 | 0 | 0 | | | | | | | | | | |
|---|---|---|---|---|---|---|---|---|---|---|---|---|---|---|
| Legacy | 0 | 0 | 0 | 0 | | | | | | | | | | |

Negative Score Example

A negative score would result from the comparison set forth immediately below. The negative value 90 specified in the matching table 65 for the particular field would be added to the negative accumulator.

| Transaction | 2 | 3 | 4 | 5 | | | | | | | | | | |
|---|---|---|---|---|---|---|---|---|---|---|---|---|---|---|
| Legacy | 1 | 2 | 3 | 4 | | | | | | | | | | |

Or

| Transaction | 1 | 1 | 5 | 3 | 5 | | 1 | 2 | T | H | | | | |
|---|---|---|---|---|---|---|---|---|---|---|---|---|---|---|
| Legacy | 1 | 2 | | | | | | | | | | | | |

Or

| Transaction | 1 | 2 | 3 | 4 | 5 | | | | | | | | | |
|---|---|---|---|---|---|---|---|---|---|---|---|---|---|---|
| Legacy | 1 | 2 | 3 | 4 | | | | | | | | | | |

Or

| Transaction | | | | | | | | | | | | | | |
|---|---|---|---|---|---|---|---|---|---|---|---|---|---|---|
| Legacy | 1 | 2 | 3 | 4 | | | | | | | | | | |

Or

| Transaction | W | E | S | T | | 1 | 2 | 3 | 4 | | S | T | | |
|---|---|---|---|---|---|---|---|---|---|---|---|---|---|---|
| Legacy | 1 | 2 | 3 | 4 | | | | | | | | | | |

Null Score Example

The null score is not applicable to the N# comparison mechanism.

Compare Code "NE"

The NE comparison mechanism compares two fields for a match when both fields contain valid (non-blank) data. The NE comparison mechanism assigns positive scores when fields do not match.

Positive Score Example

A positive score would result from the comparison set forth immediately below. The positive value 85 specified in the matching table 65 for the particular field would be added to the positive accumulator.

| Transaction | F | E | R | N | W | O | O | D | | | | | | |
|---|---|---|---|---|---|---|---|---|---|---|---|---|---|---|
| Legacy | C | H | U | R | C | H | I | L | L | | | | | |

Negative Score Example

A negative score would result from the comparison set forth immediately below. The negative value 90 specified in the matching table 65 for the particular field would be added to the negative accumulator.

| Transaction | F | A | I | R | , | I | S | A | A | C |  |  |  |
|---|---|---|---|---|---|---|---|---|---|---|---|---|---|
| Legacy | F | A | I | R | , | I | S | A | A | C |  |  |  |

Null Score Example

A negative score would result from the comparison set forth immediately below. Neither the positive nor the negative accumulators are incremented as a result of a null score.

| Transaction | F | A | I | R | , | I | S | A | A | C |  |  |  |
|---|---|---|---|---|---|---|---|---|---|---|---|---|---|
| Legacy |  |  |  |  |  |  |  |  |  |  |  |  |  |

Compare Code "NK"

The NK comparison mechanism compares two fields for a match when both fields contain valid (non-blank) data. The NK comparison matches affirmatively if one fields is a nickname of the other. The NK comparison mechanism also matches positive if one field has an initial and that initial matches the first letter of the name in the other field or the first letter of the nickname associated with the name in the other field.

Positive Score Example

A positive score would result from the comparison set forth immediately below. The positive value 85 specified in the matching table 65 for the particular field would be added to the positive accumulator.

| Transaction | R | O | B | E | R | T |
|---|---|---|---|---|---|---|
| Legacy | B | O | B |  |  |  |
| Or |  |  |  |  |  |  |
| Transaction | R |  |  |  |  |  |
| Legacy | R | O | B | E | R | T |
| Or |  |  |  |  |  |  |
| Transaction | R |  |  |  |  |  |
| Legacy | B | O | B |  |  |  |

Negative Score Example

A negative score would result from the comparison set forth immediately below. The negative value 90 specified in the matching table 65 for the particular field would be added to the negative accumulator.

| Transaction | D | O | N | A | L | D |
|---|---|---|---|---|---|---|
| Legacy | D | A | N | I | E | L |
| Or |  |  |  |  |  |  |
| Transaction | J |  |  |  |  |  |
| Legacy | T | H | O | M | A | S |
| Or |  |  |  |  |  |  |
| Transaction | T |  |  |  |  |  |
| Legacy | J |  |  |  |  |  |

Null Score Example

A null score would result from the comparison set forth immediately below. Neither the positive nor the negative accumulators are incremented as a result of a null score.

| Transaction | D | O | N | A | L | D |
|---|---|---|---|---|---|---|
| Legacy |  |  |  |  |  |  |

Compare Code "R#"

The R# comparison mechanism compares two fields for a match when both fields contain valid (non-blank) data. Before performing the comparison, the R# mechanism will right justify both fields. The syntax of the R# comparison is comprised of the "R" token and a symbol reflecting the length of the comparison. The length token, also referred to as "#", is a single numeric digit and can take on the value of 0 through nine, inclusive. Where the length token is set to zero (0), the N# comparison will compare ten character positions in the two fields compared. Otherwise, the length compared is defined by the value of the length symbol. In the case of the R# comparison mechanism, the number of positions compared is from the right end of the field.

Positive Score Example

Using a comparison code of "R6", a positive score would result from the comparison set forth immediately below. The positive value 85 specified in the matching table 65 for the particular field would be added to the positive accumulator.

| Transaction | R | T | 2 | , | P | . | O | . | B | O | X | 9 | 3 | 8 |
|---|---|---|---|---|---|---|---|---|---|---|---|---|---|---|
| Legacy | R | R | 1 |  | , | B | O | X | 9 | 3 | 8 |  |  |  |

Negative Score Example

A negative score would result from the comparison set forth immediately below. The negative value 90 specified in the matching table 65 for the particular field would be added to the negative accumulator.

| Transaction | R | T | 2 | , | P | . | O | . | B | O | X | 9 | 3 | 8 |
|---|---|---|---|---|---|---|---|---|---|---|---|---|---|---|
| Legacy | R | R | 1 |  | B | X | 9 | 3 | 8 |  |  |  |  |  |

Null Score Example

A null score would result from the comparison set forth immediately below. Neither the positive nor the negative accumulators are incremented as a result of a null score.

| Transaction | R | T | 2 | , | P | . | O | . | B | O | X | 9 | 3 |   |
|---|---|---|---|---|---|---|---|---|---|---|---|---|---|---|
| Legacy | R | R | 1 | B | X | 9 | 3 | 8 |   |   |   |   |   |   |

Compare Code "SR"

The SR comparison mechanism compares two fields for a match when both fields contain valid (non-blank) data. The SR comparison is a reverse Soundex comparison. The Soundex value for each field is derived by first reversing the order of the characters in each field. Once the characters are reversed in order, the first letter in each word is retained and all occurrences of "A", "E", "H", "I", "O", "U", "W" and "Y" in subsequent positions are eliminated. The remaining subsequent letters, i.e. not the first letter in a word, are replaced by a numeric value according to the following table:

| Alpha Character | Numeric |
|---|---|
| B, F, P, V | 1 |
| C, G, J, K, Q, S, X, Z | 2 |
| D, T | 3 |
| L | 4 |
| M, N | 5 |
| R | 6 |

Once the alpha character are replaced according to the foregoing table, any letters that are adjacent and have the same numeric value are eliminated leaving only the first numeric value. The result of this operation is converted to a letter followed by three digits. This is done by adding trailing zeros if there are less than three numeric value following the letter. Any numeric values in excess of three are simply truncated.

Positive Score Example

A positive score would result from the comparison set forth immediately below. The positive value 85 specified in the matching table 65 for the particular field would be added to the positive accumulator.

| Transaction | J | E | N | S | E | N |   |
|---|---|---|---|---|---|---|---|
| Legacy | J | O | H | N | S | O | N |

Negative Score Example

A negative score would result from the comparison set forth immediately below. The negative value 90 specified in the matching table 65 for the particular field would be added to the negative accumulator.

| Transaction | J | O | N | E | S |   |   |
|---|---|---|---|---|---|---|---|
| Legacy | J | O | H | N | S | O | N |

Null Score Example

A null score would result from the comparison set forth immediately below. Neither the positive nor the negative accumulators are incremented as a result of a null score.

| Transaction |   |   |   |   |   |   |
|---|---|---|---|---|---|---|
| Legacy | J | O | H | N | S | O | N |

Compare Code "SX"

The SX comparison mechanism compares two fields for a match when both fields contain valid (non-blank) data. The SX comparison is a straight Soundex comparison. The Soundex value for each field is derived by first reversing the order of the characters in each field. Once the characters are reversed in order, the first letter in each word is retained and all occurrences of "A", "E", "H", "I", "O", "U", "W" and "Y" in subsequent positions are eliminated. The remaining subsequent letters, i.e. not the first letter in a word, are replaced by a numeric value according to the following table:

| Alpha Character | Numeric |
|---|---|
| B, F, P, V | 1 |
| C, G, J, K, Q, S, X, Z | 2 |
| D, T | 3 |
| L | 4 |
| M, N | 5 |
| R | 6 |

Once the alpha character are replaced according to the foregoing table, any letters that are adjacent and have the same numeric value are eliminated leaving only the first numeric value. The result of this operation is converted to a letter followed by three digits. This is done by adding trailing zeros if there are less than three numeric value following the letter. Any numeric values in excess of three are simply truncated.

Positive Score Example

A positive score would result from the comparison set forth immediately below. The positive value 85 specified in the matching table 65 for the particular field would be added to the positive accumulator.

| Transaction | J | E | N | S | E | N |   |
|---|---|---|---|---|---|---|---|
| Legacy | J | O | H | N | S | O | N |

Negative Score Example

A negative score would result from the comparison set forth immediately below. The negative value 90 specified in the matching table 65 for the particular field would be added to the negative accumulator.

| Transaction | J | O | N | E | S |   |
|---|---|---|---|---|---|---|
| Legacy | J | O | H | N | S | O | N |

Null Score Example

A null score would result from the comparison set forth immediately below. Neither the positive nor the negative accumulators are incremented as a result of a null score.

| Transaction |   |   |   |   |   |   |
|---|---|---|---|---|---|---|
| Legacy | J | O | H | N | S | O | N |

Compare Code "W#"

The W# comparison mechanism compares two fields for a match when both fields contain valid (non-blank) data. The syntax of the W# comparison is comprised of the "W" token and a symbol reflecting the length of the comparison. The length token, also referred to as "#", is a single numeric digit and can take on the value of 0 through nine, inclusive. Where the length token is set to zero (0), the W# comparison will compare ten character positions in the two fields compared. Otherwise, the length compared is defined by the value of the length symbol.

The W# comparison mechanism will find a match if there is at most one transposition error. For the purposes of comparison, the W# mechanism will treat 'E', 'O', and '0' (zero) as the same character. The characters 'I', 'L', and '1' (one) are also treated as the same character. Before making the comparison, the W# mechanism will remove adjacent duplicates of either alpha or numeric characters. Blanks and punctuation characters are also removed and both fields are compressed. The comparison only considers the number of character positions specified in the length symbol following the 'W ' token.

Positive Score Example

A positive score would result from the comparison set forth immediately below. The positive value 85 specified in the matching table 65 for the particular field would be added to the positive accumulator.

| Transaction | 1 | 1 | 2 | 3 | 4 | A |
|---|---|---|---|---|---|---|
| Legacy | 1 | 2 | 3 | 4 | A |   |

Or

| Transaction | 1 | 8 | A | A |
|---|---|---|---|---|
| Legacy | 1 | 8 | A |   |

Or

| Transaction | 1 | 8 | 0 |
|---|---|---|---|
| Legacy | 1 | 8 | O |

Or

| Transaction | 1 | 3 | 2 | 4 |
|---|---|---|---|---|
| Legacy | 1 | 2 | 3 | 4 |

Or

| Transaction | 1 | 1 | P | L |
|---|---|---|---|---|
| Legacy | 1 | 9 | 1 |   |

Or

| Transaction | 0 | 0 | 0 | 0 |
|---|---|---|---|---|
| Legacy | 0 | 0 | 0 | 0 |

Negative Score Example

A negative score would result from the comparison set forth immediately below. The negative value 90 specified in the matching table 65 for the particular field would be added to the negative accumulator.

| Transaction | 1 | 2 | 3 | 4 | 5 |   |   |   |   |
|---|---|---|---|---|---|---|---|---|---|
| Legacy | 1 | 2 | 3 | 4 |   |   |   |   |   |

Or

| Transaction | 1 | 1 | 5 | 3 | 5 |   | 1 | 2 | T | H | S |
|---|---|---|---|---|---|---|---|---|---|---|---|
| Legacy | 1 | 2 |   |   |   |   |   |   |   |   |   |

Or

| Transaction | 2 | 3 | 4 | 5 |
|---|---|---|---|---|
| Legacy | 1 | 2 | 3 | 4 |

Or

| Transaction | 1 | 2 | 3 | 4 | 5 |
|---|---|---|---|---|---|
| Legacy | 1 | 3 | 2 | 5 | 4 |

Or

| Transaction | W | E | S | T |   | 1 | 2 | 3 | 4 |   | S | T |
|---|---|---|---|---|---|---|---|---|---|---|---|---|
| Legacy | 1 | 2 | 3 | 4 |   |   |   |   |   |   |   |   |

Null Score Example

A null score would result from the comparison set forth immediately below. Neither the positive nor the negative accumulators are incremented as a result of a null score.

| Transaction |   |   |   |   |   |   |   |   |   |
|---|---|---|---|---|---|---|---|---|---|
| Legacy | W | E | S | T | 1 | 2 | 3 | 4 | S | T |

Compound Comparison

The present invention provides a means of comparing records in a compound fashion where three distinct comparison codes are used to dictate the level of compounding to be applied in the comparison. The "%1", "%8", and "%7" comparison codes are used to invoke the compound comparison mechanism in this manner.

Calling the matching routine with a %1 comparison code results in comparing two fields for equality in a manner analogous to the equal ("=") compare mechanism. If the comparison fails, then the compound mechanism will perform a comparison of the two fields comparing only the number of character positions in each field as dictated by the length of the shortest of the two fields. This second comparison can be invoked directly by using the %8 comparison code. If this second comparison fails, then both fields are converted to a numeric value. This is done by assigning the same value to all vowels and removing all blanks and special characters. The percentage difference between the two values is then compared to a threshold to determine is a match should be declared. The numeric conversion mechanism is invoked by the %7 comparison code.

Numeric Equivalents

Two comparison mechanisms in the present invention convert an alpha string into a numeric equivalent. This is done by the method described here. First, all vowels are assigned a numeric value of 193. Second, all blanks, dashes, periods, slashes, number signs, underscores, commas and apostrophes are assigned a value of 0. Once this is done, all other characters in the text string are assigned a numeric value according to the table below:

| Character | Numeric Value |
|---|---|
| b | 130 |
| c | 131 |
| d | 132 |
| f | 134 |
| g | 135 |
| h | 136 |
| j | 145 |
| k | 146 |
| l | 147 |
| m | 148 |
| n | 149 |
| p | 151 |
| q | 152 |
| r | 153 |
| s | 162 |
| t | 163 |
| v | 165 |
| w | 166 |
| x | 167 |
| y | 168 |
| z | 169 |
| B | 194 |
| C | 195 |
| D | 196 |
| F | 198 |
| G | 199 |
| H | 200 |
| J | 209 |
| K | 210 |
| L | 211 |
| M | 212 |
| N | 213 |
| P | 215 |
| Q | 216 |
| R | 217 |
| S | 226 |
| T | 227 |
| V | 229 |
| W | 230 |
| X | 231 |
| Y | 232 |
| Z | 233 |
| 0 | 240 |
| 1 | 241 |
| 2 | 242 |
| 3 | 243 |
| 4 | 244 |
| 5 | 245 |
| 6 | 246 |
| 7 | 247 |
| 8 | 248 |
| 9 | 249 |

After having converted each character into a numeric equivalent, all but one of any adjacent numeric equivalents having the same value are removed. The remaining numeric equivalents are then summed together to yield the value that will be compared.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents. Some, but by no means all of the possible alternatives are described herein.

I claim:

1. A method for matching transactions against a known database of records comprising the steps of:
   accepting a transaction record;
   accepting a plurality of known records;
   comparing each field as interest in the transaction record to the corresponding field in each of said known records;
   creating a positive match score for each field in each of said known records that is based on the comparison of the transaction record to the known record;
   summing the positive match scores for each of the fields for each of the known records;
   comparing the sum of the positive match scores for each of the known records to a first threshold; and
   declaring a match for the known record if said sum of the positive match scores for that known record exceeds the first threshold.

2. The method of claim 1 wherein the positive match score for each field of said known records is obtained from a configuration file.

3. The method of claim 1 wherein the first threshold is obtained from a configuration file.

4. The method of claim 1 further comprising the steps of:
   creating a negative match score for each field in each of said known records that is based on the comparison of the transaction record to the known record;
   summing the negative match scores for each of the fields for each of the known records;
   comparing the sum of the negative match scores for each of the known records to a second threshold;
   comparing the sum of the negative match scores for each of the known records to a second threshold; and
   declaring a mismatch for the known record if said sum of the negative match scores for that known record falls below falls below the second threshold.

5. The method of claim 4 wherein the negative match score for each field of said known records is obtained from a configuration file.

6. The method of claim 4 wherein the second threshold is obtained from a configuration file.

7. The method of claim 4 further comprising the steps of:
   subtracting the sum of the negative match scores from the sum of the positive match scores for each of the known records to yield a net match score for each of said known records;
   comparing the net match score for each of said known records to a third threshold; and
   declaring a match for the known record if said net match score for that known record exceeds the third threshold.

8. The method of claim 7 wherein the third threshold is obtained from a configuration file.

9. The method of claim 1 wherein the step of comparing each field against the corresponding field in a known record consists of one of the following methods:

comparing for equality if both fields are non-blank;

comparing for equality even if one or both fields are blank;

removing blanks and punctuation and then comparing for equality;

comparing gender code for equality;

comparing name and gender code for equality;

translating text to numeric equivalents and then comparing if both fields are non-blank;

compressing blanks and special characters and then comparing the shorter of the data lengths;

comparing in a close alpha manner where prior to performing an alpha comparison blanks, punctuation and numerics are removed and wherein the comparison allows one transposition and treats "E" and "O" as equal;

comparing for equality wherein the comparison allows blanks to compare to a preset value;

removing blanks and punctuation, then compressing the field and then comparing the left most characters;

comparing numerics only wherein the comparison allows one transposition;

isolating the right-most numerics and then comparing;

comparing numerics only, wherein the comparison allows one transposition and blanks compared to a value are assigned a negative score and blanks compared to blanks are assigned a positive score;

comparing for inequality if both fields are non-blank;

comparing first names for matches using nicknames, initials and full first names;

right justifying and then comparing;

reversing the field order and then comparing phonetically;

comparing fields phonetically; and comparing in alpha/numeric manner but allowing one transposition.

10. An apparatus for matching a transaction against a known database of records comprising:

transaction reception unit that receives a transaction record;

legacy record reception unit that receives a plurality of known records; and positive match field comparison unit that:
compares each field of the transaction record to a corresponding field in one record of said plurality of known records and increments a first accumulator whenever the field in the transaction record matches the field in the one known record; and
generates a record match indicator signal when the value stored in the first accumulator exceeds the value stored in a first threshold register.

11. The transaction matching apparatus of claim 10 wherein the first accumulator has a first programmable increment register and said first increment register is loaded from a configuration file.

12. The transaction matching apparatus of claim 10 wherein the value stored in said first threshold register is loaded from a configuration file.

13. The transaction matching apparatus of claim 10 further comprising:

negative match field comparison unit that:
compares each field of the transaction record to a corresponding field in one record of said plurality of known records and increments a second accumulator whenever the field in the transaction record does not matches the field in the one known record; and
generates a mis-match indicator signal when the value stored in the second accumulator exceeds the value stored in a second threshold register.

14. The transaction matching apparatus of claim 13 wherein the second accumulator has a second programmable increment register and said second increment register is loaded from a configuration file.

15. The transaction matching apparatus of claim 13 wherein the value stored in said second threshold register is loaded from a configuration file.

16. The transaction matching apparatus of claim 13 further comprising:

difference unit that receives the value stored in said first accumulator and the value stored in said second accumulator and stores the difference of these values in a difference register; and difference match field comparison unit that generates a match indicator signal when the value stored in the difference register exceeds the value stored in a third threshold register.

17. The transaction matching apparatus of claim 16 wherein the third threshold register is loaded from a configuration file.

18. The transaction matching apparatus of claim 10 wherein the positive match field comparison unit is programmable to operate in one of the following modes:

equality mode that recognizes a field match condition if each character in each field position in both records is identical and one or both records contains some non-blank characters;

equality with blanks mode that recognizes a field match condition if each character in each field position in both records is identical;

compressed alphanumeric mode that recognizes a match condition if each character in each filed position in both records is identical after having first removes all blank and punctuation characters and compressing both fields;

gender compare mode that recognizes a field match condition when the both fields contains a gender code that is identical;

gender and name compare mode that recognizes a field match condition when both fields contains a gender code and name that are identical;

numeric equivalents mode that recognizes a field match condition when each field in each record is the same value after having converted a textual string into a numeric equivalent;

compressed minimum length mode that recognizes a field match condition when each character position in each field is identical in as many character positions that are non-blank in the shortest of the two fields after having removed all blank and punctuation characters and then compressing both fields;

close alpha match mode that recognizes a field match condition when all characters in each character position of each fields are identical after having removed blank characters, punctuation characters, numeric characters and allowing two character positions between the two fields to be transposed and treating the characters "E" and "O" as equal;

blank equivalent mode that recognizes a field match condition when all characters in each character position of each fields are identical or one of the fields contains all blank characters;

compressed mode that recognizes a field match condition when all characters in the left most character positions of each field are identical after first compressing each field;

numeric mode that recognizes a field match condition when each of the character positions in the right most portion of each field are identical after having first isolated the numeric characters in each field;

transposed numeric mode that recognizes a field match condition when the numeric values in each of the compared fields is identical except for one transposition or when a both fields contain only blank characters;

not equivalent mode that recognizes a field match condition when in fact the two fields from two records are not identical;

nickname mode that recognizes a field match condition when the name specified in the field in the first record is the nickname of the name specified in the field in the second record or when both records contain a single initial that is identical in each record or when the field in one record has an initial and the field in the other record contains a name beginning with that initial or a nickname corresponding to a name beginning with the initial;

right justification mode that recognizes a field match condition when each character position in each field from the two record being compared contains the identical character after having right justified both fields;

reverse phonetic mode that recognizes a field match condition when a phonetic code for each field is identical after having first reversed to order of the characters in each field being compared and before creating said phonetic code;

phonetic mode that recognizes a field match condition when a phonetic code for each field is identical; and single transposition mode that recognizes a field match condition when each character position in each field being compared is identical except for the transposition of two character position in any of the two fields being compared.

19. The transaction matching apparatus of claim 13 wherein the negative match field comparison unit is programmable to operate in one of the following modes:

equality mode that recognizes a field mis-match condition if each character in each field position in both records is not identical and one or both records contains some non-blank characters;

equality with blanks mode that recognizes a field mis-match condition if each character in each field position in both records is not identical;

compressed alphanumeric mode that recognizes a mis-match condition if each character in each filed position in both records is not identical after having first removes all blank and punctuation characters and compressing both fields;

gender compare mode that recognizes a field mis-match condition when the both fields contain a gender code that is not identical;

gender and name compare mode that recognizes a field mis-match condition when both fields contains a gender code and name that are not identical;

numeric equivalents mode that recognizes a field mis-match condition when each field in each record is not the same value after having converted a textual string into a numeric equivalent;

compressed minimum length mode that recognizes a field mis-match condition when each character position in each field is not identical in as many character positions that are non-blank in the shortest of the two fields after having removed all blank and punctuation characters and then compressing both fields;

close alpha match mode that recognizes a field mis-match condition when all characters in each character position of each fields are not identical after having removed blank characters, punctuation characters, numeric characters and allowing two character positions between the two fields to be transposed and treating the characters "E" and "O" as equal;

blank equivalent mode that recognizes a field mis-match condition when all characters in each character position of each fields are not identical or one of the fields contains all blank characters;

compressed mode that recognizes a field mis-match condition when all characters in the left most character positions of each field are not identical after first compressing each field;

numeric mode that recognizes a field mis-match condition when each of the character positions in the right most portion of each field are not identical after having first isolated the numeric characters in each field;

transposed numeric mode that recognizes a field mis-match condition when the numeric values in each of the compared fields is not identical except for one transposition or when a both fields contain only blank characters;

not equivalent mode that recognizes a field mis-match condition when in fact the two fields from two records are identical;

nickname mode that recognizes a field mis-match condition when the name specified in the field in the first record is not the nickname of the name specified in the field in the second record and when both records contain a single initial that is not identical in each record or when the field in one record has an initial or the field in the other record does not contain a name beginning with that initial and a nickname not corresponding to a name beginning with the initial;

right justification mode that recognizes a field mis-match condition when each character position in each field from the two record being compared does not contain the identical character after having right justified both fields;

reverse phonetic mode that recognizes a field mis-match condition when a phonetic code for each field is not identical after having first reversed to order of the characters in each field being compared and before creating said phonetic code;

phonetic mode that recognizes a field mis-match condition when a phonetic code for each field is not identical; and single transposition mode that recognizes a field mis-match condition when each character position in each field being compared is not identical except for the transposition of two character position in any of the two fields being compared.

* * * * *

UNITED STATES PATENT AND TRADEMARK OFFICE
CERTIFICATE OF CORRECTION

PATENT NO. : 6,636,850 B2  Page 1 of 1
APPLICATION NO. : 09/750525
DATED : October 21, 2003
INVENTOR(S) : Lepien It is certified that error appears in the above-identified patent and that said Letters Patent is hereby corrected as shown below:

On Title Page, [74] Attorney, Agent, or Firm:, replace "Elenn Patent Group; Michael A. Glenn" with - - - "Glenn Patent Group; Michael A. Glenn"

Signed and Sealed this

Eighth Day of August, 2006

JON W. DUDAS
*Director of the United States Patent and Trademark Office*